United States Patent
Trummer

(10) Patent No.: US 11,635,285 B2
(45) Date of Patent: Apr. 25, 2023

(54) DISTANCE MEASURING DEVICE, IN PARTICULAR FOR DIELECTRIC AND METALLIC TARGET OBJECTS

(71) Applicant: Astyx GmbH, Ottobrunn (DE)

(72) Inventor: Stefan Trummer, Strasslach-Dingharting (DE)

(73) Assignee: CRUISE MUNICH GMBH, Ottobrunn (DE)

( * ) Notice: Subject to any disclaimer, the term of this patent is extended or adjusted under 35 U.S.C. 154(b) by 71 days.

(21) Appl. No.: 17/306,568

(22) Filed: May 3, 2021

(65) Prior Publication Data
US 2021/0254959 A1      Aug. 19, 2021

Related U.S. Application Data

(63) Continuation of application No. 15/313,483, filed as application No. PCT/EP2015/001039 on May 21, 2015, now Pat. No. 10,996,045.

(30) Foreign Application Priority Data

May 23, 2014   (DE) ................. 10 2014 007 643.1

(51) Int. Cl.
| | |
|---|---|
| G01B 7/14 | (2006.01) |
| H01P 7/10 | (2006.01) |
| G01B 15/00 | (2006.01) |
| H01Q 9/04 | (2006.01) |

(52) U.S. Cl.
CPC .............. *G01B 7/14* (2013.01); *G01B 15/00* (2013.01); *H01P 7/10* (2013.01); *H01Q 9/0492* (2013.01)

(58) Field of Classification Search
CPC .. G01B 15/00; G01B 7/14; H01P 7/10; H01Q 9/0492

See application file for complete search history.

(56) References Cited

U.S. PATENT DOCUMENTS

| | | | |
|---|---|---|---|
| 4,706,052 A | 11/1987 | Hattori et al. | |
| 5,059,929 A | 10/1991 | Tanaka | |
| 6,445,191 B1 | 9/2002 | Trummer | |

(Continued)

FOREIGN PATENT DOCUMENTS

| | | |
|---|---|---|
| CN | 1129995 A | 8/1996 |
| CN | 1472842 A | 2/2004 |

(Continued)

OTHER PUBLICATIONS

"Reexamination Notice for Chinese Patent Application No. 201580040017.2", dated Mar. 9, 2022, 6 pages.

(Continued)

*Primary Examiner* — Son T Le
*Assistant Examiner* — Adam S Clarke
(74) *Attorney, Agent, or Firm* — Calfee, Halter & Griswold LLP

(57) ABSTRACT

Disclosed is a distance measuring device, in particular for dielectric or metallic target objects, said device comprising a sensor with a resonance chamber and a resonance structure. The resonance structure has an element consisting of a dielectric material which has a narrowing at the edge, the resonance frequency of the resonance chamber being dependent on the distance between the element and a target object.

20 Claims, 23 Drawing Sheets

(56) References Cited

U.S. PATENT DOCUMENTS

| | | | |
|---|---|---|---|
| 6,564,637 B1* | 5/2003 | Schalk | G01P 21/00 73/1.38 |
| 6,600,394 B1 | 7/2003 | Wang et al. | |
| 7,173,435 B1 | 2/2007 | Fay et al. | |
| 10,996,045 B2 | 5/2021 | Trummer | |
| 2001/0015649 A1* | 8/2001 | Herrmann | G01N 22/04 324/632 |
| 2006/0097826 A1* | 5/2006 | Srivastava | H01P 7/10 333/219.1 |
| 2007/0026567 A1* | 2/2007 | Beer | H01Q 1/44 257/E23.114 |
| 2007/0229197 A1 | 10/2007 | Okano | |
| 2009/0140751 A1 | 6/2009 | Takeuchi et al. | |
| 2011/0030197 A1* | 2/2011 | Lagrotta | H01P 11/008 29/592.1 |
| 2011/0181300 A1 | 7/2011 | Bowring et al. | |
| 2012/0212386 A1 | 8/2012 | Massie et al. | |
| 2015/0048843 A1 | 2/2015 | Hinken | |
| 2015/0263399 A1 | 9/2015 | Kawamura et al. | |
| 2016/0124083 A1 | 5/2016 | Fericean et al. | |
| 2017/0307350 A1 | 10/2017 | Trummer | |
| 2017/0368892 A1 | 12/2017 | Heuermann et al. | |

FOREIGN PATENT DOCUMENTS

| | | |
|---|---|---|
| CN | 106796108 A | 5/2017 |
| DE | 19618710 A1 | 11/1996 |
| DE | 102008061227 A1 | 7/2010 |
| DE | 102014007643 A1 | 11/2015 |
| EP | 1000314 B1 | 4/2002 |
| EP | 3146591 B1 | 7/2021 |
| JP | S61139102 A | 6/1986 |
| JP | S61139103 A | 6/1986 |
| JP | H02168702 A | 6/1990 |
| JP | 2001512229 A | 8/2001 |
| JP | 6554537 B2 | 7/2019 |
| WO | 2015176822 A1 | 11/2015 |

OTHER PUBLICATIONS

"Decision on the Granting of a European Patent according to Article 97(1) for European Patent Application No. 15730056.7", dated Jul. 1, 2021, 2 Pages.

"International Search Report and Written Opinion for PCT Patent Application No. PCT/EP2015/001039", dated Sep. 17, 2015, 7 Pages.

"International Preliminary Report on Patentability for PCT Patent Application No. PCT/EP2015/001039", dated Nov. 29, 2016, 12 Pages.

"Preliminary Amendment for U.S. Appl. No. 15/313,483", filed Feb. 17, 2017, 9 Pages.

"Non-Final Office Action for U.S. Appl. No. 15/313,483", dated Jan. 18, 2019, 17 Pages.

"Office Action issued in Chinese Patent Application No. 201580040017.2", dated Jan. 16, 2019, 20 Pages.

"Reply to Non-Final Office Action for U.S. Appl. No. 15/313,483", filed Mar. 8, 2019, 10 Pages.

"Office Action issued in Japanese Patent Application No. 2017513317", dated Mar. 12, 2019, 5 Pages.

"Office Action issued in Chinese Patent Application No. 201580040017.2", dated Mar. 22, 2019, 10 Pages.

"Final Office Action for U.S. Appl. No. 15/313,483", dated Jun. 13, 2019, 9 Pages.

"Reply to Final Office Action for U.S. Appl. No. 15/313,483", filed Sep. 11, 2019, 4 Pages.

"Advisory Action for U.S. Appl. No. 15/313,483", dated Dec. 2, 2019, 3 Pages.

"Reply to Advisory Action for U.S. Appl. No. 15/313,483", filed Dec. 4, 2019, 8 Pages.

"Office Action issued in Chinese Patent Application No. 201580040017.2", dated Jun. 28, 2019, 10 Pages.

"Search Report in German Patent Application No. 102014007643", dated Feb. 2, 2015, 13 Pages.

"Non-Final Office Action for U.S. Appl. No. 15/313,483", dated Dec. 31, 2019, 20 Pages.

"Office Action issued in Chinese Patent Application No. 201580040017.2", dated Jan. 19, 2020, 13 Pages.

"Office Action issued in European Patent Application No. 15730056.7", dated Jan. 31, 2020, 5 Pages.

"Office Action issued in European Patent Application No. 15730056.7", dated Jun. 11, 2019, 6 Pages.

"Reply to Non-Final Office Action for U.S. Appl. No. 15/313,483", filed Apr. 30, 2020, 11 Pages.

"Final Office Action for U.S. Appl. No. 15/313,483", dated Aug. 10, 2020, 21 Pages.

"Office Action issued in Chinese Patent Application No. 201580040017.2", dated Jul. 23, 2020, 10 Pages.

"Notice of Allowance for Japanese Patent Application No. 2017513317", dated Jun. 18, 2019, 5 Pages.

"Reply to Final Office Action for U.S. Appl. No. 15/313,483", filed Dec. 9, 2020, 12 Pages.

"Notice of Allowance and Fees Due for U.S. Appl. No. 15/313,483", dated Jan. 6, 2021, 10 Pages.

"Response to the Reexamination Notice for Chinese Patent Application No. 201580040017.2", Filed Date: May 5, 2022, 17 pages.

"Reexamination Notice for Chinese Patent Application No. 201580040017.2", dated Jul. 28, 2022, 9 pages.

"Response to the Reexamination Notice for Chinese Patent Application No. 201580040017.2", Filed Date: Sep. 13, 2022, 8 pages.

"Decision of Reexamination for Chinese Patent Application No. 201580040017.2", dated Sep. 30, 2022, 14 pages.

"Office Action for Chinese Patent Application No. 201580040017.2", dated Feb. 2, 2023, 8 pages.

* cited by examiner

Simulation Targets:
Target frequency change, high quality, small wall currents large mode clarity range, simple coupling Mode of Opperation Cross-Section E Field Target Distance = 0.5 mm:  Without Target:

Metal Target

Reflective:

$f_R > f0$

Dielectric Target er = 10

Transmitting:

$f_T < f0$ $f0$

Reduction of Sensor Diameter

Increase of Sensor Diameter

*Mode of Operation H111/E110*

*Cross-Section E-Field*

Without a Target

Target Distance 5mm:

DISTANCE MEASURING DEVICE, IN PARTICULAR FOR DIELECTRIC AND METALLIC TARGET OBJECTS

CROSS-REFERENCE TO RELATED APPLICATIONS

This application is a continuation of U.S. patent application Ser. No. 15/313,483, filed on Jun. 8, 2017, and entitled "Distance measuring device, in particular for dielectric and metallic target objects", which is a national stage application under 35 U.S.C. § 371 of international App. No. PCT/EP2015/001039, filed May 21, 2015, which claims priority to German App. No. DE 10 2014 007 643.1, filed May 23, 2014. The entireties of these applications are incorporated herein by reference.

TECHNICAL FIELD

The invention relates to a distance measuring device, in particular for dielectric and metallic target objects.

BACKGROUND

EP 1 000 314 B discloses a distance measuring device comprising a sensor and evaluation electronics in which the sensor has a resonator in the form of a cavity resonator that is filled with a fluid material, e.g. air or inert gas.

Alternatively, inductive, capacitive, optical and ultrasonic sensors are used for measurements in the close range.

Inductive sensors are based on the principle of alternating magnetic fields and work exclusively with metallic targets, the material and its size having to be known in order to obtain a high degree of measuring accuracy. Inductive sensors that are fitted directly next to one another influence one another because their detection range comprises an angle range of up to 180°. In addition, static and dynamic magnetic fields can have a negative impact upon the functionality of the sensor. The measuring accuracy also fluctuates with the temperature.

With capacitive sensors, for a reliable distance measurement both the material and the object size of the target must be known. Furthermore, the measuring accuracy is influenced by the air humidity, the temperature and electromagnetic fields.

Optical sensors can only be used in industrial applications to a limited extent because their functionality is not guaranteed in contaminated environments.

With ultrasonic sensors the measuring accuracy is greatly dependent upon the environmental conditions such as e.g. the air humidity and the temperature.

SUMMARY

With the invention a distance measuring device according to claim 1 is devised that can be used in particular for dielectric or metallic targets, but also for other target materials such as e.g. coated plastic materials, and that is characterised by very good measuring properties.

Furthermore, with the invention a device, e.g. a distance measuring device, according to claim 16 is devised that is characterised by special resonance properties or resonance modes.

Some embodiments are specified in the sub-claims.

In one, a number of or all of the exemplary embodiments of the distance measuring device according to the invention or of the distance measuring method according to the invention one is offered the advantage that a considerable increase in range is achieved, i.e. the measurable distance between the sensor and the target object is clearly increased e.g. by the factor of 2 to 3 in comparison to inductive proximity sensors of the same size.

Desired design requirements can also be met at the same time here, such as for example mode purity in the largest possible frequency range; easy coupling and decoupling of the electromagnetic waves into the resonator; and/or small wall currents of the sensor at the boundaries between the dielectric material and air.

In one, a number of or all of the exemplary embodiments of the distance measuring device according to the invention or of the distance measuring method according to the invention a sensor is used that can be in the form e.g. of a factor 1 sensor. This type of sensor can have the same measuring curve with all targets if these are, for example, metals, and the size of the target surface area does not significantly fall short of the diameter or the sensor surface area of the sensor.

With one, a number of or all of the exemplary embodiments, due to special composition structures, this sensor can have a small amount of installation spring, and is therefore only slightly displaced height-wise upwards or downwards, or not at all, with respect to the components surrounding the sensor.

According to one aspect of the invention a distance measuring device is provided that can be used in particular for dielectric or metallic target objects and comprises a sensor with a resonance chamber and a resonance structure, the resonance structure having an element consisting of a dielectric material which has a narrowing at the edge. The resonance frequency of the resonance chamber is dependent on the distance between the element and a target object.

The narrowing at the edge can be a circumferential, e.g. rotationally, symmetrical, narrowing, e.g. in the form of a recess or a groove, that can have, for example, a rectangular cross-section.

The element can be angular or cylindrical in form.

The narrowing can have e.g. a height of 5 to 25% or 10 to 20% or approximately 15% of the element height, or be 0.2 to 1.0 mm, or optionally 0.5 to 0.7 mm, or approximately 0.6 mm high.

Furthermore or alternatively, the narrowing can have, for example, a depth of 5 to 25% or 10 to 20% or approximately 15% of the element width, or be 1.0 to 3.8 mm, or optionally 1.6 to 3.2 mm or approximately 2.4 mm deep. The narrowing can be positioned in the upper third of the element above an upper sleeve edge, if this is provided.

The lower region of the element, optionally including the edge surfaces of the narrowing, can be entirely, partially or predominantly metallised, and plastic can be injection moulded around the outer and/or the upper region of the element.

The resonance structure of the sensor can be disposed at least partially within a sleeve, and the element can be positioned within the sleeve so that an upper region of the element is located partially above the sleeve.

In one, a number of or all of the exemplary embodiments of the distance measuring device a signal generator for generating an optionally frequency-modulated signal can be provided that is coupled into the resonance structure, a signal being decoupled at another point of the resonance structure with the given resonance.

The distance measuring device can comprise means for mixing down a signal decoupled from the resonance structure into a baseband, for amplifying it, for filtering it and/or for converting it from analogue to digital.

The distance measuring device can contain at least one oscillator for generating a signal coupled into the resonance structure and a local oscillator signal (LO signal) and a mixer to which the signal decoupled from the resonance structure and the local oscillator signal can be delivered.

The resonance structure can be formed in such a way that it can be excited electrically and/or magnetically.

In one or a number of exemplary embodiments or in a further aspect of the invention a device can be geometrically designed with a resonance structure in such a way that a mode is formed in the resonance structure that is at least predominantly in the form of an H111 or a TE111 and an H011 or a TE011 mode. This can be used for measuring distances, but also for other purposes.

A mode can contain a portion the form of which is distinct like a TM mode.

The narrowing at the edge of the sensor can act like a throttle and transform short circuit properties into idling properties.

In one or a number of exemplary embodiments, in order to achieve rotationally symmetrical sensor properties, at least two resonator coupling points can be provided that can be offset geometrically by a specific angle or distance. Signals with a specific phase difference of, for example, 90°, optionally with the same amplitude, can be fed into the at least two resonator coupling points so that circulation of the mode is produced.

With another aspect of the invention a distance measuring method, in particular for dielectric or metallic target objects, is provided that has a sensor that comprises a resonance chamber and a resonance structure, the resonance structure having an element consisting of a dielectric material which has a narrowing at the edge, a resonance frequency of the resonance chamber being dependent on the distance between the element and a target object. A signal can be fed into the resonance structure at one point, and at another point of the resonance structure a signal can be decoupled with a given resonance.

In one method, e.g., a distance measuring method, a or the resonance structure is designed geometrically such that a mode is formed in the resonance structure that is at least predominantly in the form of an H011 or a TE011 and/or an H111 or a TE111 mode.

A rotationally symmetrical sensor property can be achieved in that a signal is fed in via a first resonator coupling point and is decoupled via a second resonator coupling point that is offset to the first positioned resonator coupling point. If signals with a phase difference of for example 90°, optionally with the sample amplitude, are fed into the at least two resonator coupling points or resonator connection points, circulation of the mode is produced.

In the following the invention is described in more detail with reference to exemplary embodiments shown in the drawings.

DETAILED DESCRIPTION

In one, a number of or all of the exemplary embodiments according to FIG. 1 the principle of the sensor consists of determining the frequency of a resonance chamber that is defined by a resonance structure located within the sensor and a target that is a specific distance away from the sensor that is to be recorded, which distance is also called the target distance in the following.

The target distance can be determined on the basis of the dependency of the resonance frequency upon the target distance. In this connection the resonance structure can be coupled to or be acted on by a frequency-modulated signal, and at another point of the resonance structure, with a given resonance, a signal can be decoupled. The decoupled signal can then be mixed down into the baseband, can be amplified, filtered and/or be converted from analogue to digital.

Figure 1:
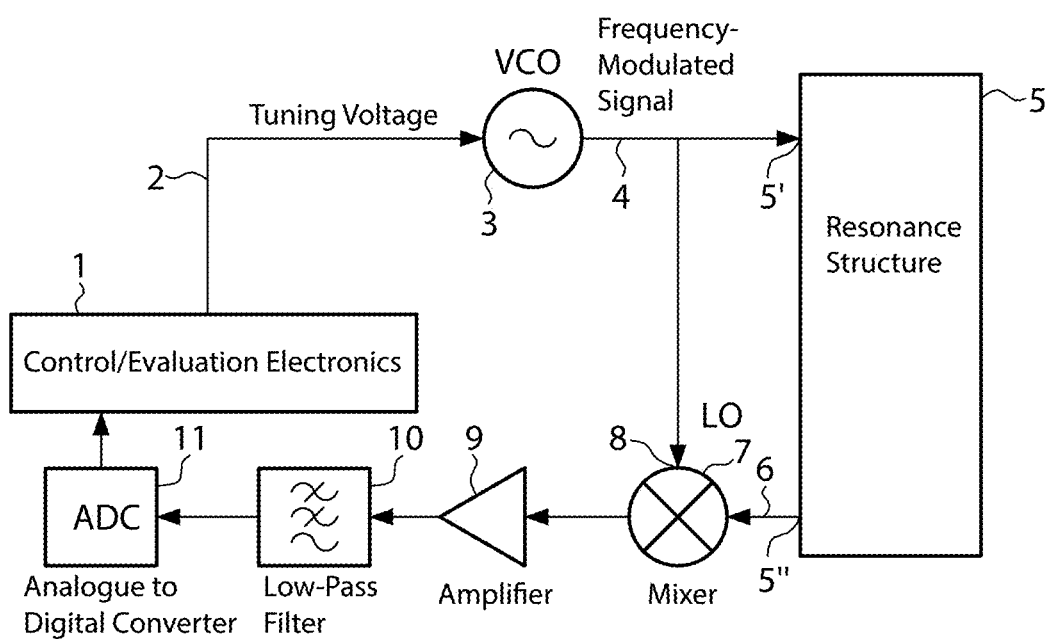
FIG. 1 shows a block diagram of an exemplary embodiment of a distance measuring device according to the invention.

As shown in FIG. 1, in the exemplary embodiment shown a control/evaluation device 1, e.g. in the form of an electronic circuit, is provided that applies a control signal, e.g. in the form of tuning voltage, to a voltage-controlled oscillator, VCO, 3 via a line 2. The frequency-modulated signal emitted by the VCO 3 is applied via a line 4 to an input connection 5' of a resonance structure 5 as an excitation signal.

A output signal is taken from the resonance structure 5 at another connection 5", which output signal is applied via a line 6 to a mixer 7 to which the signal occurring on the line 4 and fed into the resonance structure 5 is fed via a second input 8 as a local oscillator signal.

In one, a number of or all of the exemplary embodiments the output signal of the mixer 7 is conveyed via an amplifier 9, a low-pass filter 10 and/or an analogue to digital converter 11 and is then fed via an input into the control and evaluation device 1.

In many exemplary embodiments the local oscillator signal (LO signal) applied to the input 8 of the mixer 7 can be generated by an oscillator other than the VCO 3, but in the exemplary embodiment according to FIG. 1 and other exemplary embodiments is generated by the same oscillator 3 as the coupling signal at the input 5. This mixing principle makes amplitude sensitivity possible here and prevents ambiguities in resonance frequencies and couplings due to structurally identical sensors that are positioned opposite one another.

In one, a number of or all of the exemplary embodiments the sensor can have the following structure. The sensor has a resonance structure 5 that corresponds to the illustration of FIG. 2, the dimensions relating here to typical dimensions of a sensor of M18 size (metric ISO thread as the thread size for a screw-in sensor), and can be modified or varied as one wishes according to the requirement and size. In the exemplary embodiment that is illustrated, the sensor is made in the form of a round disc with a thickness of approx. 4.2 mm and a diameter of 18 mm.

In the exemplary embodiment that is illustrated the resonance structure 5 consists mainly of an element 14 made of dielectric material that is optionally cylindrical in form, a target object 20 and an air area 19 between the two objects 14, 20. With this arrangement high resonance frequencies can be achieved with small geometric ratios.

In one, a number of or all of the exemplary embodiments the dielectric material of the element 14 has a narrowing 18, for example a circumferential narrowing at the edge and/or that is rotationally symmetrical, in the form of an indentation or a recess such as for example a groove at the side edge. The lower region of the element 14 can be predominantly or entirely metallised, i.e. it can have metallisation 15. Optionally, the lower side surfaces of the element 14 and/or the boundary surfaces of the narrowing 18, i.e. the surfaces running parallel to the lower side of the sensor 5 and the inner edge side of the recess 18 running at right angles to the latter, can also be predominantly or entirely metallised, i.e. have the metallisation 15. The element 14 can be surrounded by a plastic 16, such as for example a resin, e.g. this can be injection moulded around it, which plastic covers not only all of the side regions of the element including the inside of the recess 18, but also covers the upper side of the element 14 with a smaller layer thickness.

In the lower region the element 14 is surrounded by a sensor sleeve 17 and is located in the upper region, partially above the sensor sleeve 17. The height of the sensor sleeve can e.g. be one to two thirds of the element height, but optionally ends below the recess 18 and can, for example, be approximately half the height of the element 14.

In one, a number of or all of the exemplary embodiments the narrowing 18 can have a rectangular cross-section, the narrowing being able to have a height of 5 to 25% or 10 to 20% or approximately 15% of the element height, or be e.g. 0.2 to 1.0 mm, or optionally 0.5 to 0.7 mm, or approximately 0.6 mm high.

Furthermore, the narrowing 18 can have a depth of 5 to 25% or 10 to 20% or approximately 15% of the element width, or be e.g. 1.0 to 3.8 mm, or optionally 1.6 to 3.2 nm or approximately 2.4 mm deep.

In the exemplary embodiment that is illustrated the narrowing 18 is formed on the outer edge and is positioned e.g. in the upper half or in the upper third of the element 14.

Figure 3:
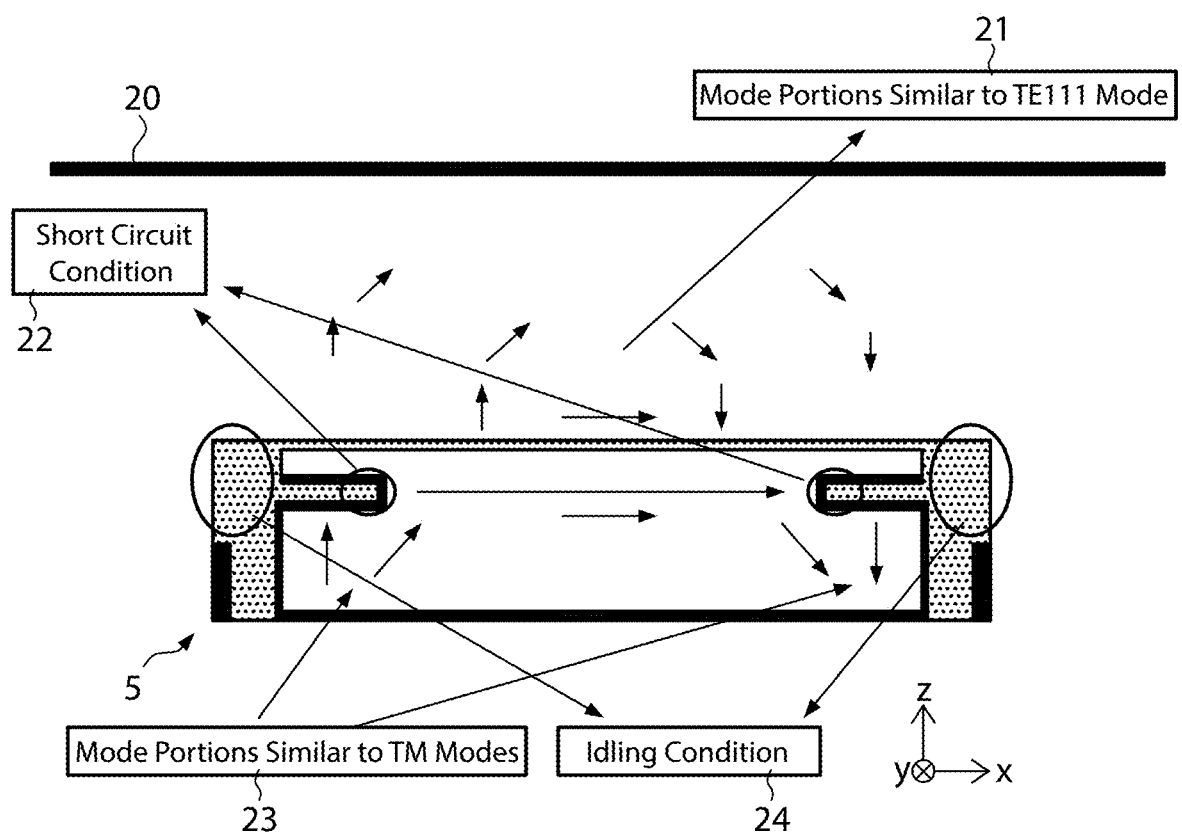
FIG. 3 shows mode portions in the resonator structure according to FIG. 2.

The resonance structure 5 is electrically or magnetically excited and is designed geometrically such that, in accordance with FIG. 3, a mode is formed in the resonance structure 5 that can predominantly be in the form of a TE111 mode. In addition, the mode has a portion the form of which is distinct like a TM mode. At the z position of the groove (i.e. the upper horizontal boundary surface of the recess 18 according to the illustration in the drawings) the electric field in the resonator 5 forms its strongest field amount-wise. At the same time the wall currents form mainly at the edge of the element 14, i.e. of the dielectric material on the inside of the groove or recess 18. In this way disruptive wall currents on the sensor surface are prevented. Outwardly, towards the sensor edge, the recess 18 (groove) acts like a throttle and transforms short circuit properties into idling properties that minimise field portions around the sensor head. These are additionally reduced by the E mode-type portions forming beneath the recess 18.

Figure 4:
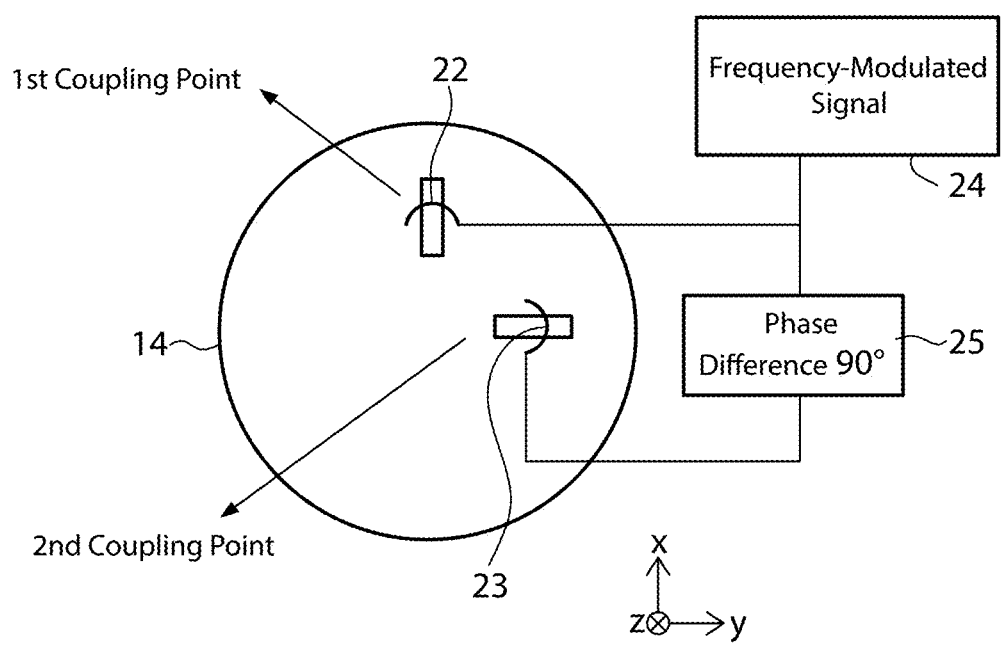
FIG. 4 shows a block diagram of an exemplary embodiment of a distance measuring device according to the invention working with circular mode.

In one, a number of or all of the exemplary embodiments rotationally symmetrical sensor properties can be achieved by circulating the mode described above. For this purpose, in accordance with FIG. 4, at least two resonator coupling points 22, 23 are provided that are geometrically offset by 90° and the signals of which are fed in with the same amplitude, but with a phase difference of 90°. FIG. 4 shows a bottom view of the element 14, i.e. in the z direction, as indicated by the coordinate arrows. The frequency-modulated signal 24 generated by the VCO 3 is applied directly to the first coupling point 22 and to a 90° phase shifter 25 the output signal of which, displaced by 90°, is applied to the second coupling point 23.

Figure 5:
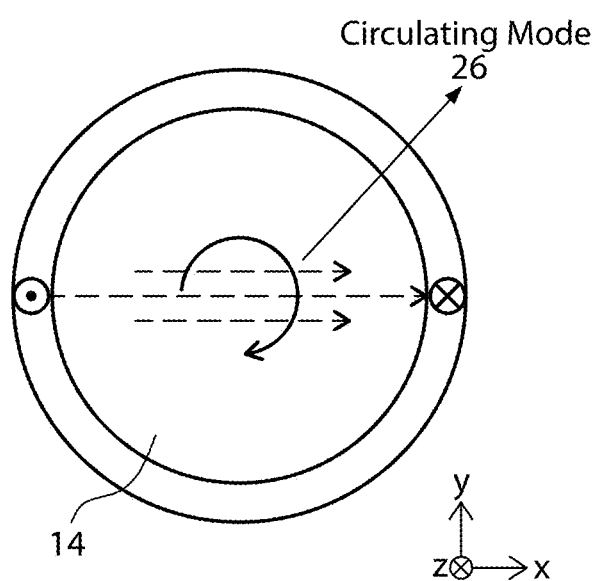
FIG. 5 shows a simplified illustration of the circular or circulating mode.

According to FIG. 5 a right- or left-circular mode 26 is thus formed. FIG. 5 shows a top view onto the element 14.

Figure 2:
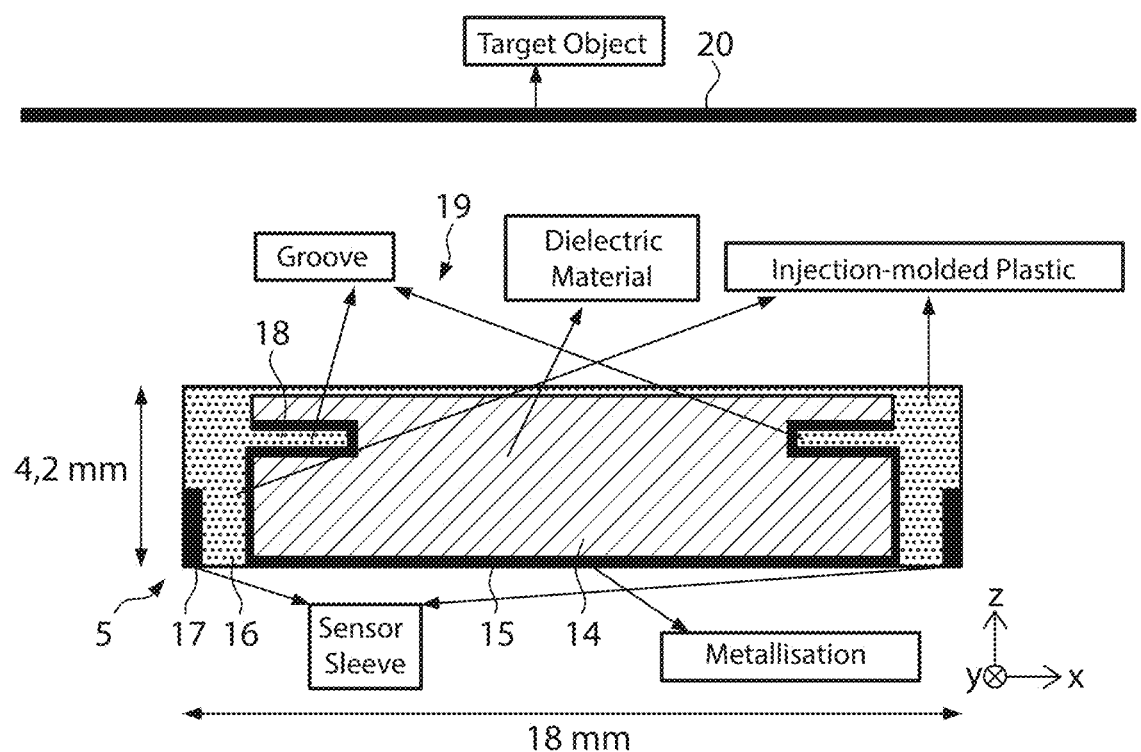
FIG. 2 shows a sectional view of an embodiment of a resonator structure that can be used in the distance measuring device or distance measurement according to the Invention.
Figure 6:
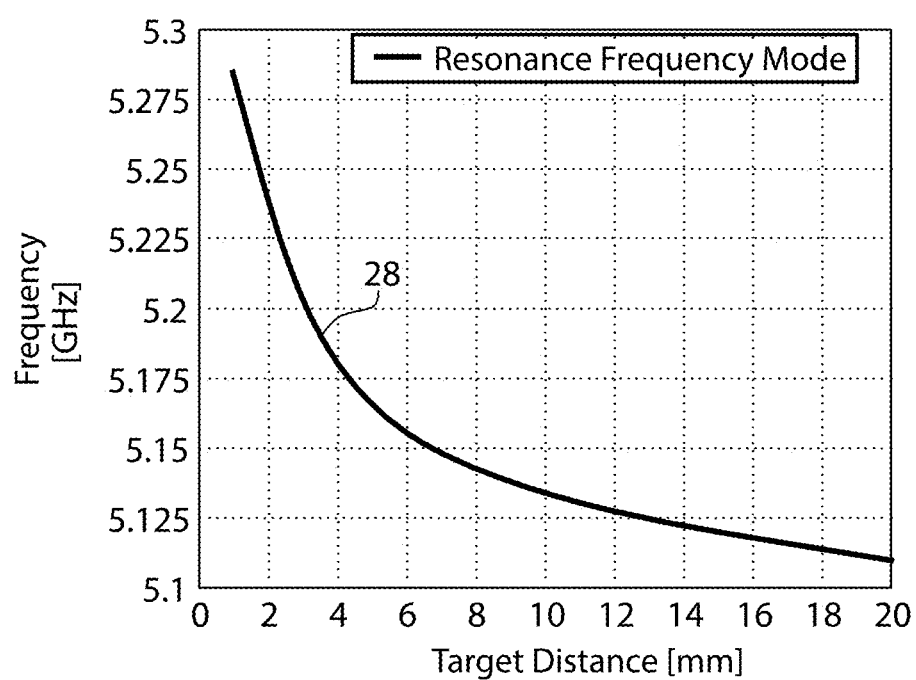
FIG. 6 shows a frequency response of the resonance frequency over the target distance.

FIG. 6 shows, as an example for the arrangement according to FIG. 2, a frequency curve 28 that illustrates the change of the resonance frequency upon changing the target distance of a metallic target 20. A particular feature of the curve 28 is a relatively linear constant frequency change over the target distance. This is determined by the mode that is used and that mainly consists of E mode-type portions and of H111 mode-type portions. The latter portions are more distinct and are crucial for the resonance frequency change over the target distance and, due to the field structure and the relatively low resonance frequency, are particularly suitable for measurements, even with large distances.

In FIG. 6 the target distance in mm is plotted on the axis of abscissas, and the frequency in GHz is plotted on the axis of ordinates.

As can be seen from FIG. 6, distance measurements for the sensor size MIS can be reliably taken over a very wide range here of less than 1 mm to more than 20 mm.

Another advantage of the sensor is the distance measurement for dielectric targets. Field portions penetrate into the dielectric target here, and due to the higher field concentration in the target and the permittivity difference between air and the target a resonance frequency shift over the target distance results that differs from metallic targets. This effect depends on the permittivity value, the thickness and the high frequency properties of the material, and can be used for measuring distance or for determining material.

In one, a number of or all of the exemplary embodiments a or the resonance structure can be designed geometrically such that a mode forms in the resonance structure that is at least predominantly in the form of an H111 mode. A new type of generator or measuring principle with a very large range is created by the H111 mode. This generator or measuring principle can be used for a measuring device, e.g. a distance measuring device or for distance measurement, but also for other purposes. It is well known that H and E modes are the German designations, whereas TM and TE are the corresponding American designations, and so e.g. "H111=TE111" and "E110=TM110".

FIGS. 7 to 23 show simulation structures and results for a resonance structure 5 in exemplary embodiments of the distance measuring device according to the invention, such as for example a ceramic resonator, e.g. in a dimmer 30, with resonance frequency, quality and switching distance, as well as frequency curves and field profiles.

Figure 7:
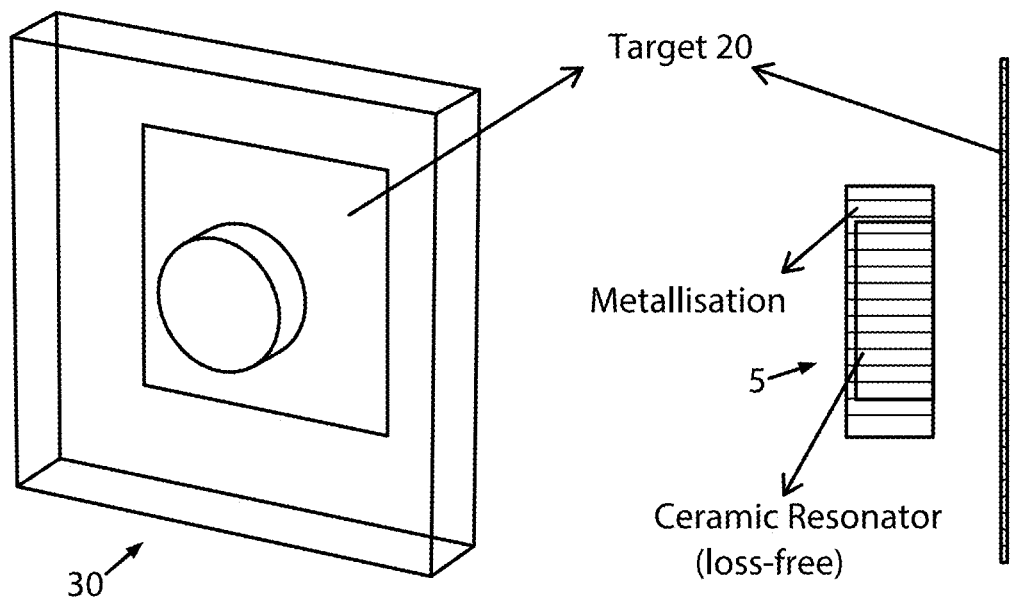
FIGS. 7 to 23 show simulation structures and results as well as frequency curves and field profiles in exemplary embodiments of the distance measuring device according to the invention.

FIG. 7 lists the simulation targets such as target_frequency change, quality, small wall currents, large mode clarity range and simple coupling.

Figure 8:
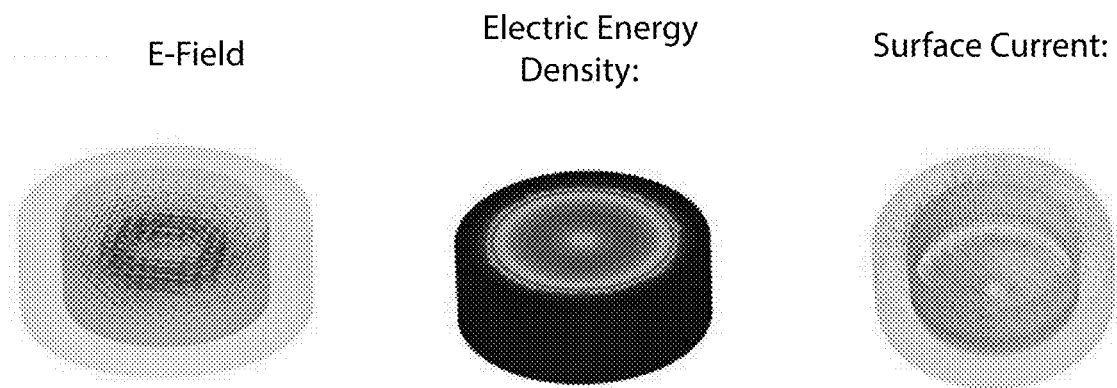

FIG. 8 shows mode formers for H011 with E-field, electric energy density and surface current.

Figure 9:
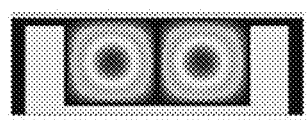
Figure 9:
Figure 9:
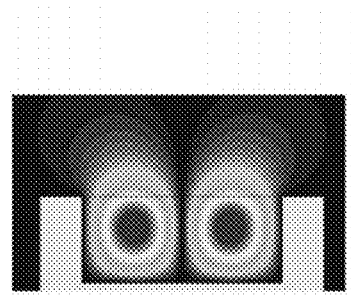

FIG. 9 shows the mode of operation with a reflective or transmitting target or without a target. The target is also to be understood to mean the target or target object here.

Figure 10:
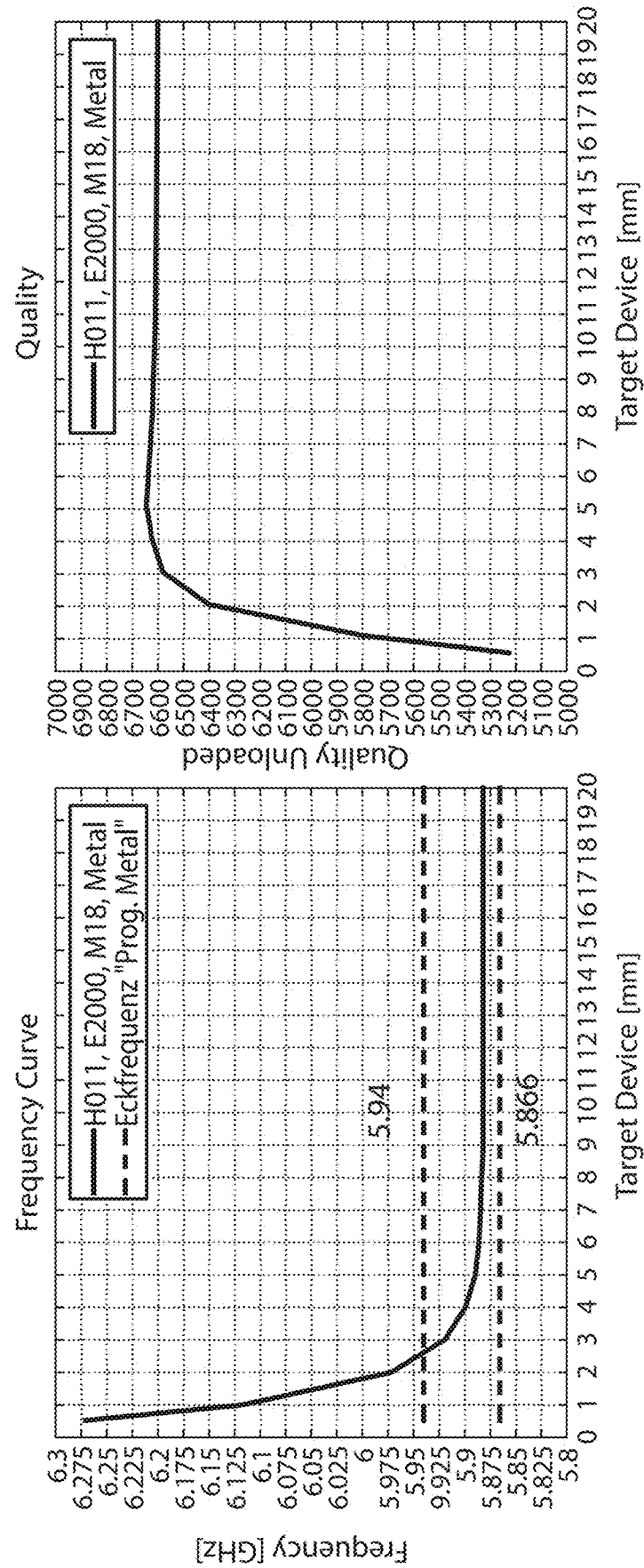

FIG. 10 illustrates the frequency and quality in the form of curves over the target distance.

Figure 11:
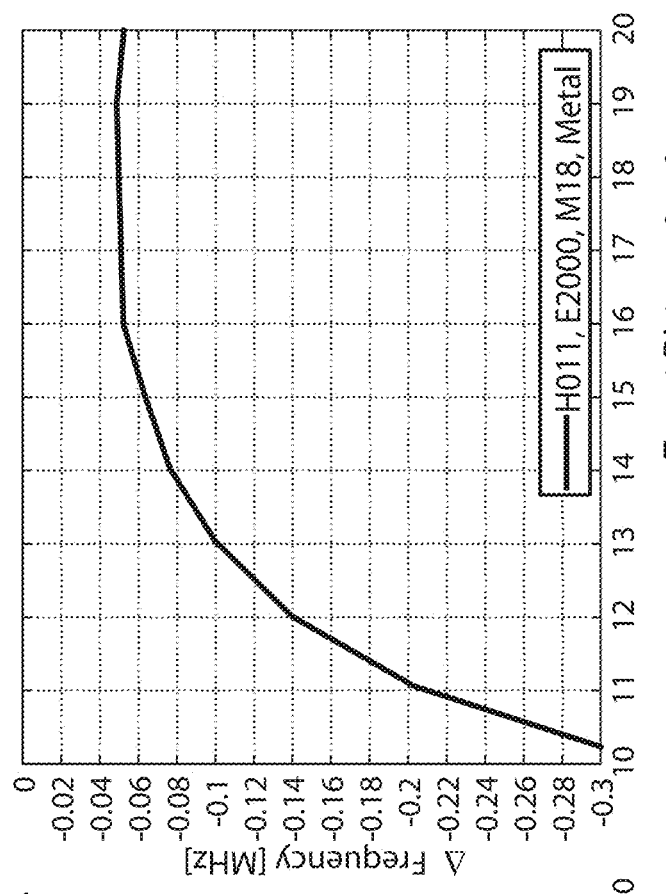
Figure 11:
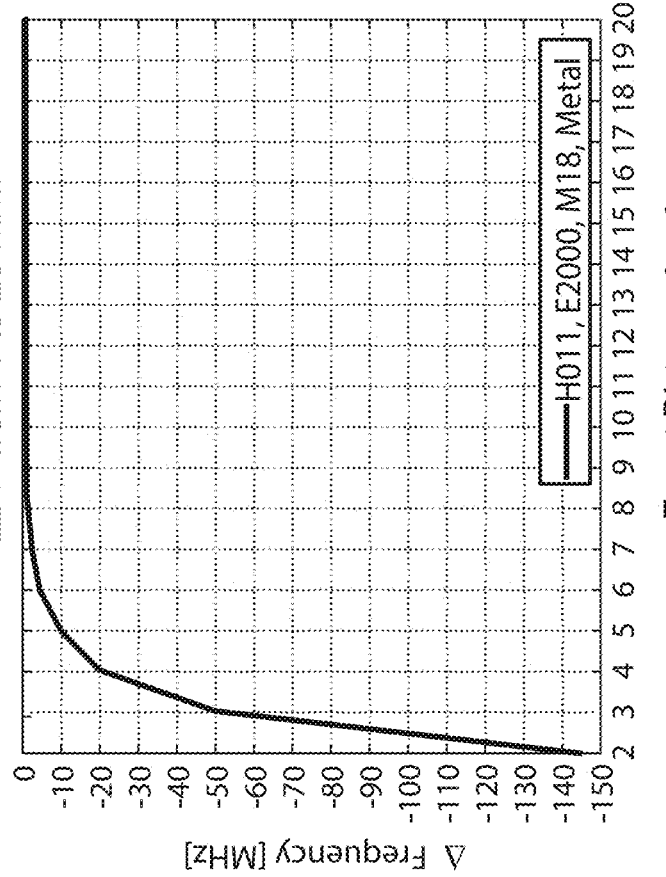

FIG. 11 illustrates frequency changes in the form of curves over the target distance.

Figure 12:
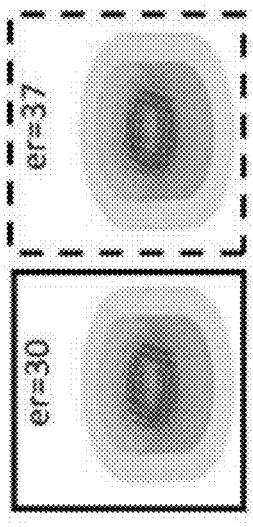
Figure 12:
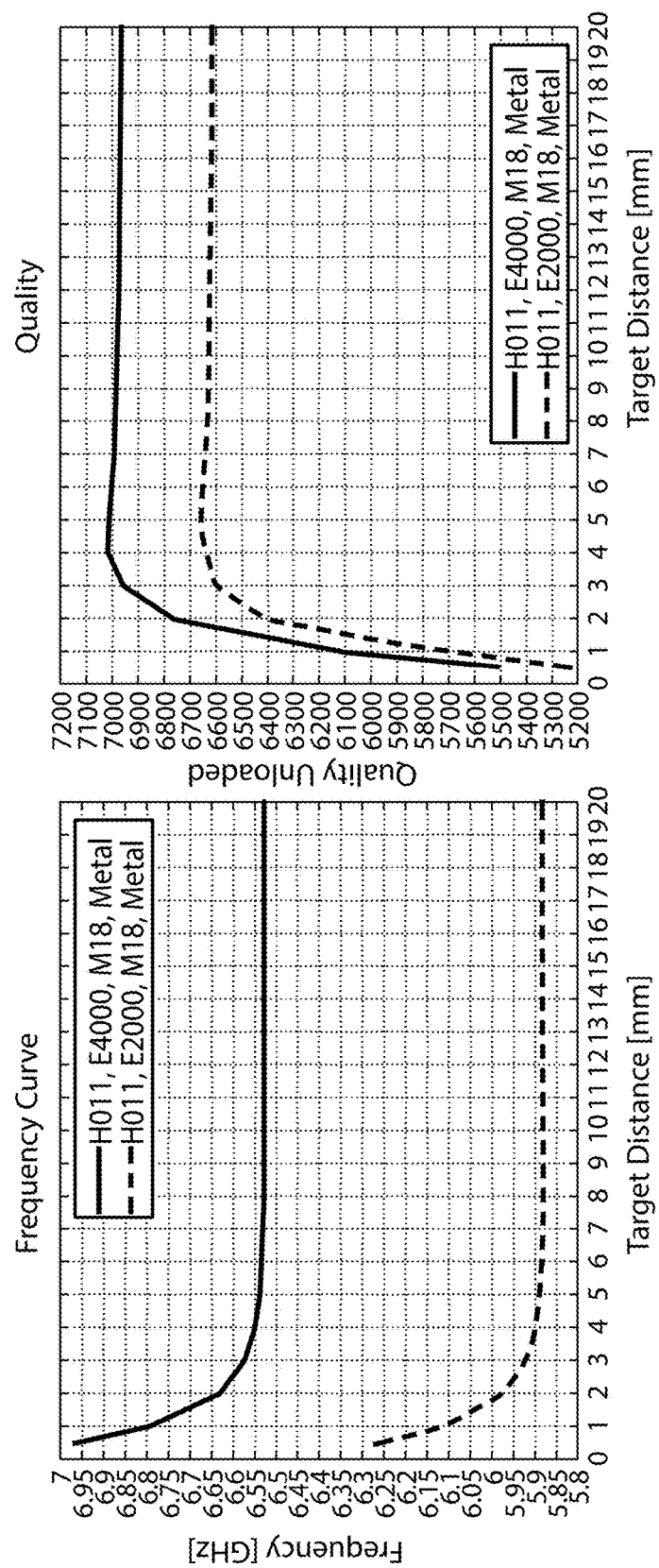

FIG. 12 relates to the change in permittivity in the form of frequency and quality curves over the target distance.

Figure 13:
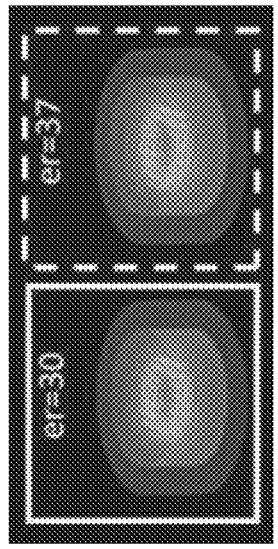
Figure 13:
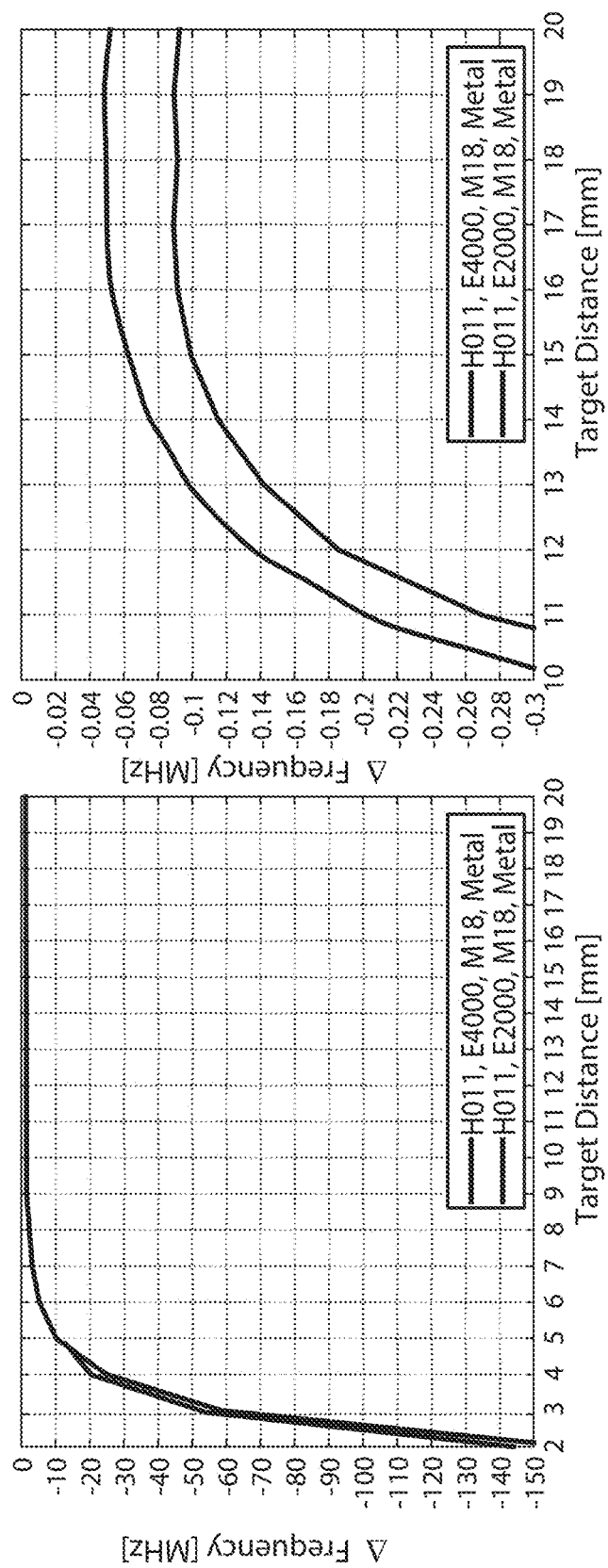

FIG. 13 shows the change in permittivity in the form of frequency change curves over the target distance.

Figure 14:
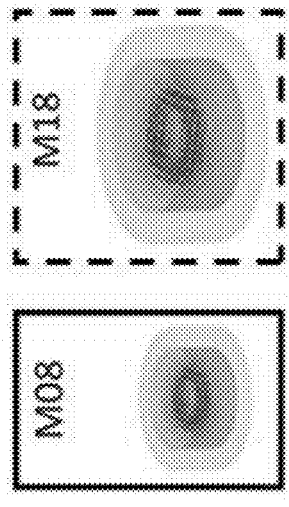
Figure 14:
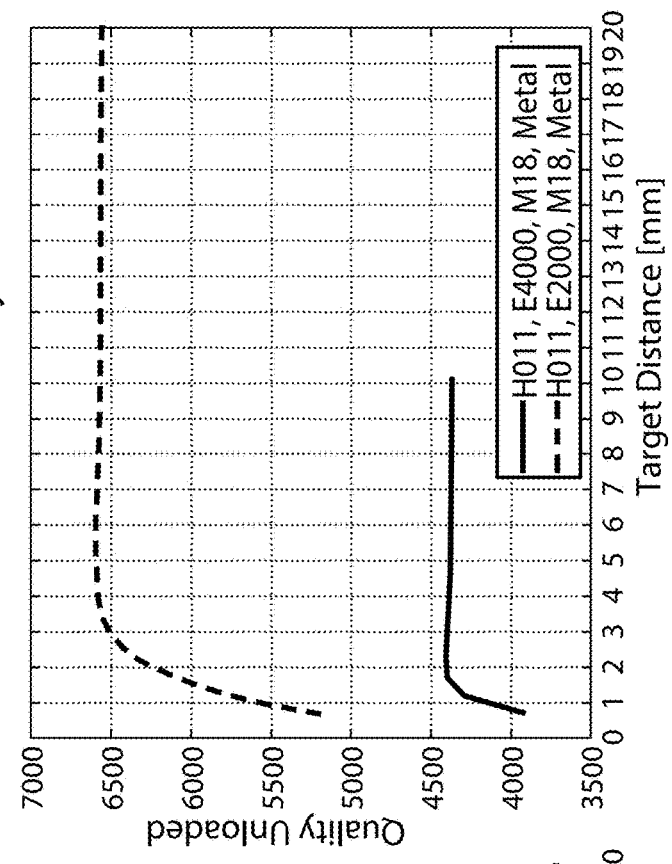
Figure 14:
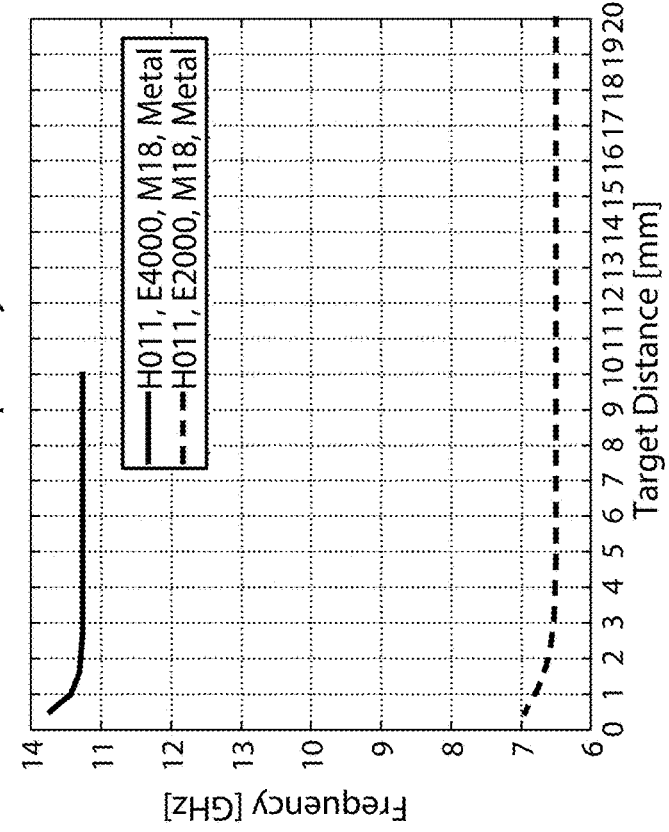

FIG. 14 illustrates effects when the sensor diameter is reduced as regards the frequency curve and quality curves over the target distance.

Figure 15:
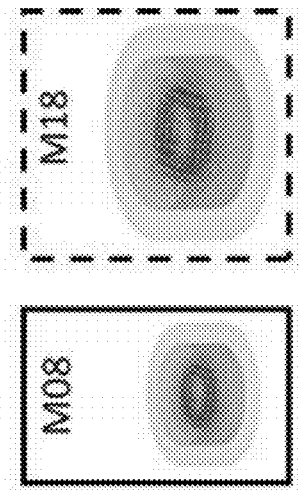
Figure 15:
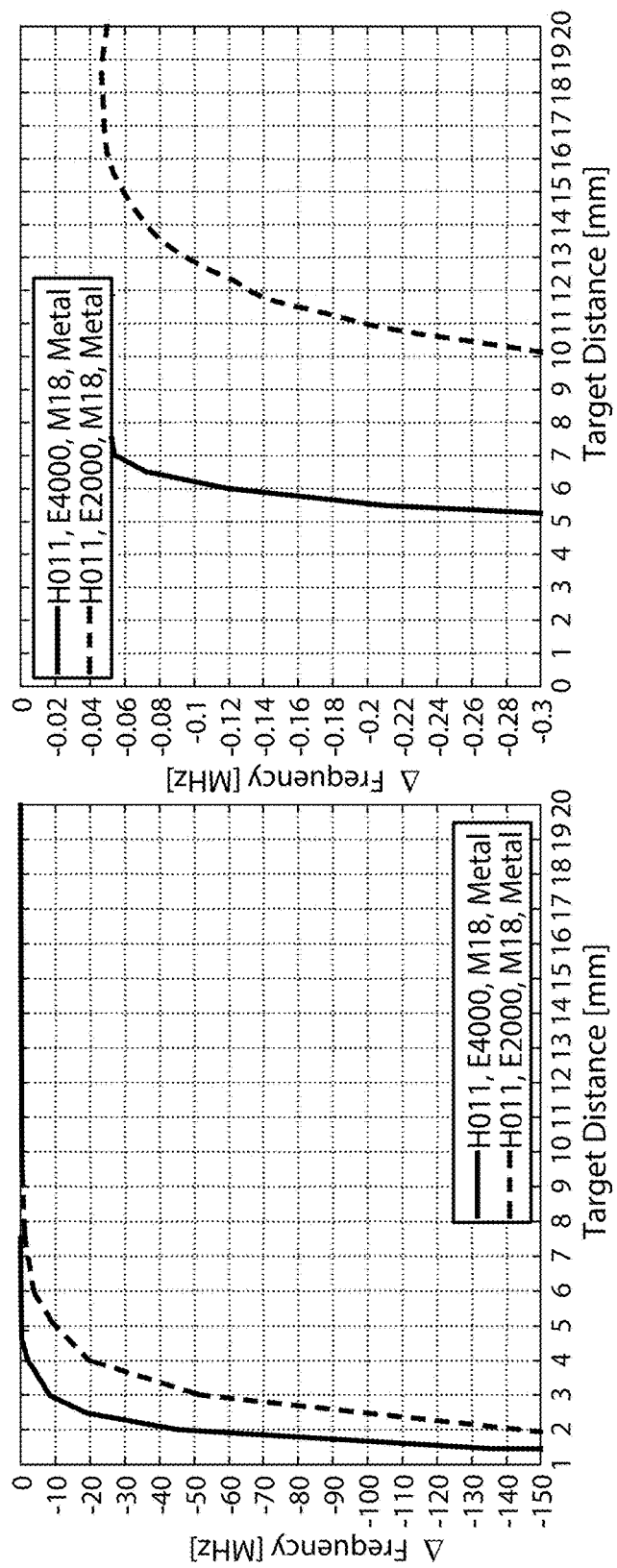

FIG. 15 illustrates effects when the sensor diameter is reduced as regards frequency changes over the target distance.

Figure 16:
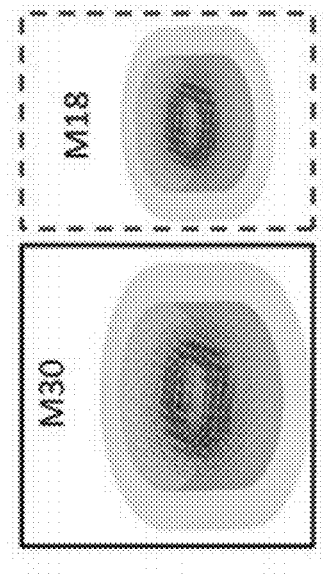
Figure 16:
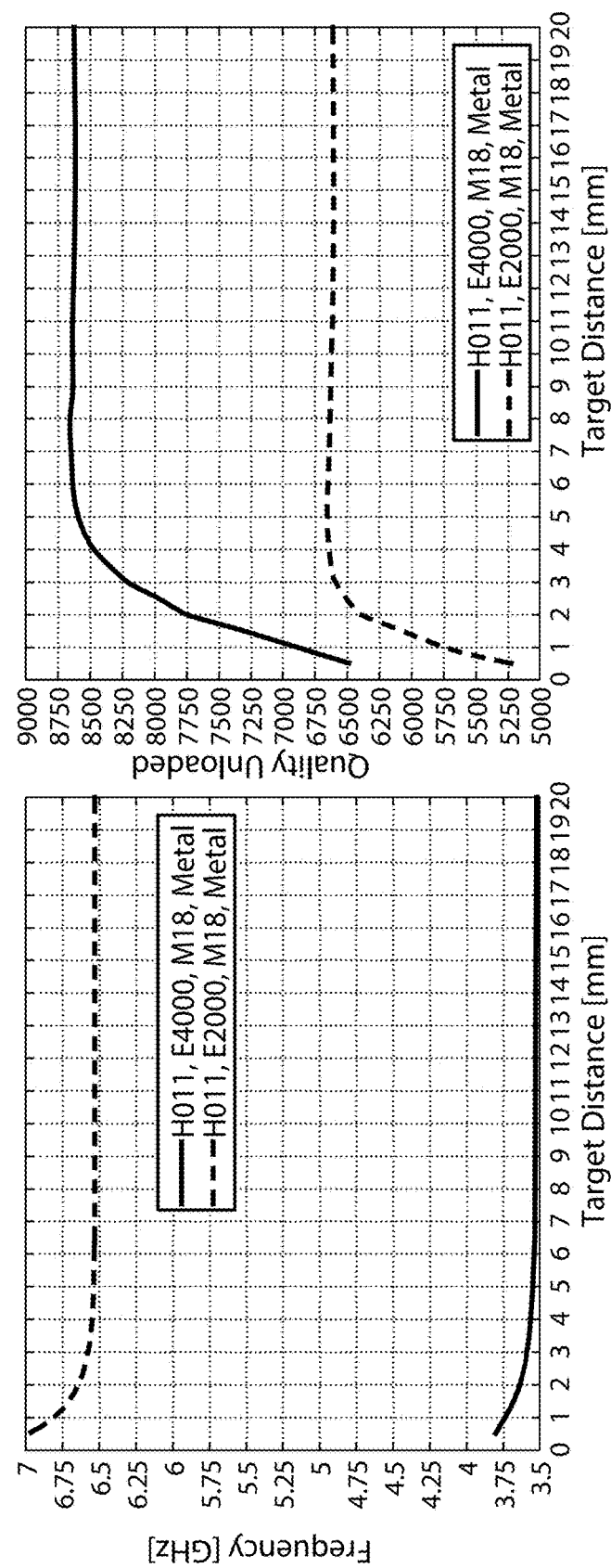

FIG. 16 illustrates effects when the sensor diameter is increased as regards the frequency curve and quality curve (unloaded) over the target distance.

Figure 17:
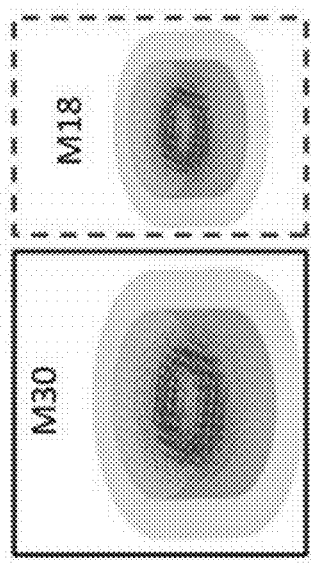
Figure 17:
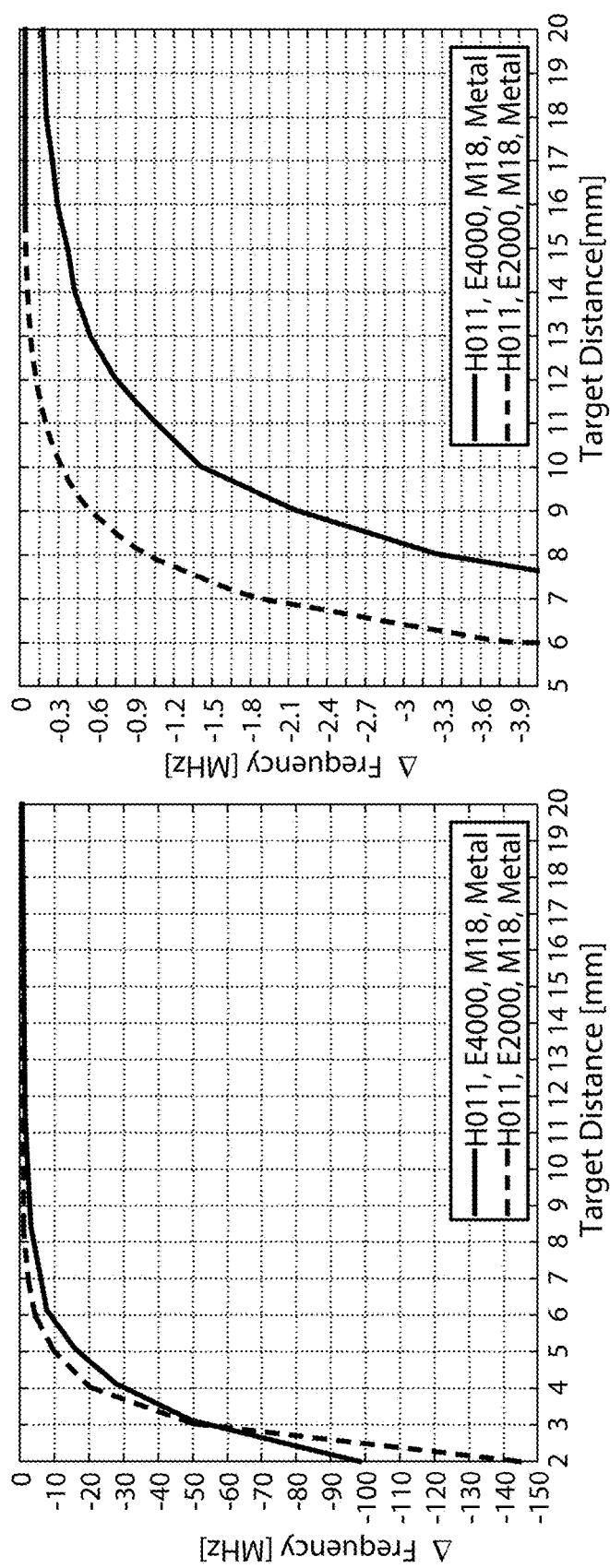

FIG. 17 illustrates effects when the sensor diameter is increased as regards frequency changes and modes.

Figure 18:
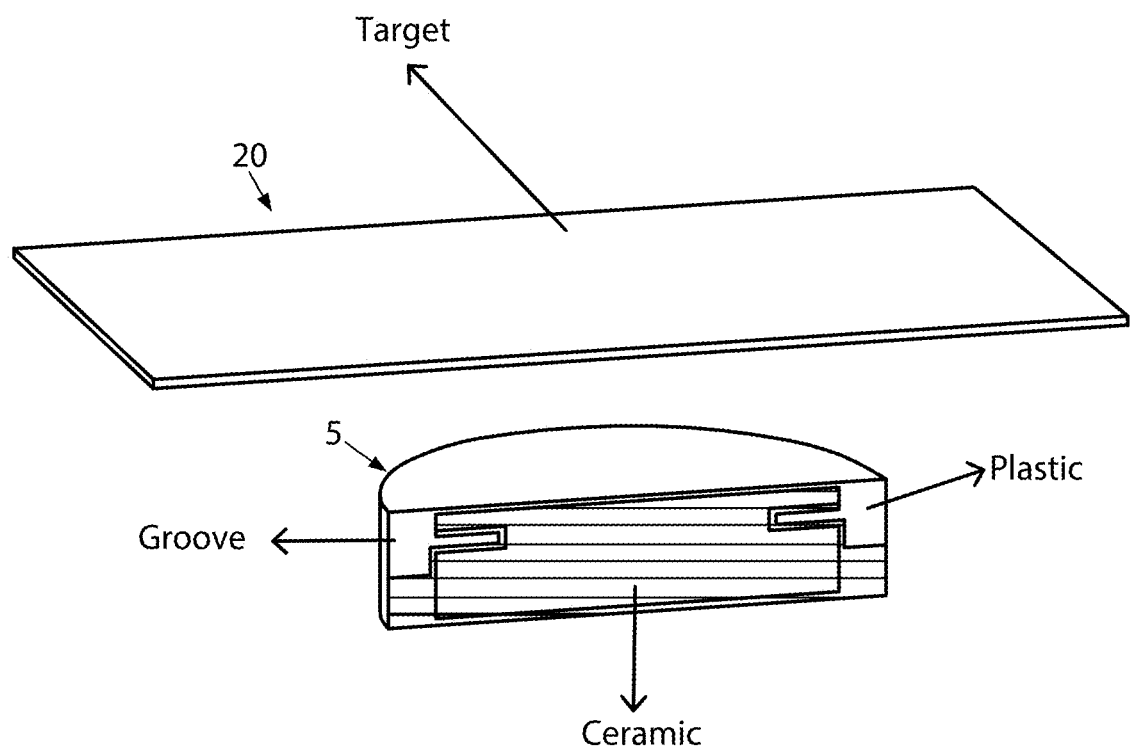

FIG. 18 shows a simulation model with the target and resonance structure for the H111/E110 mode.

Figure 19:
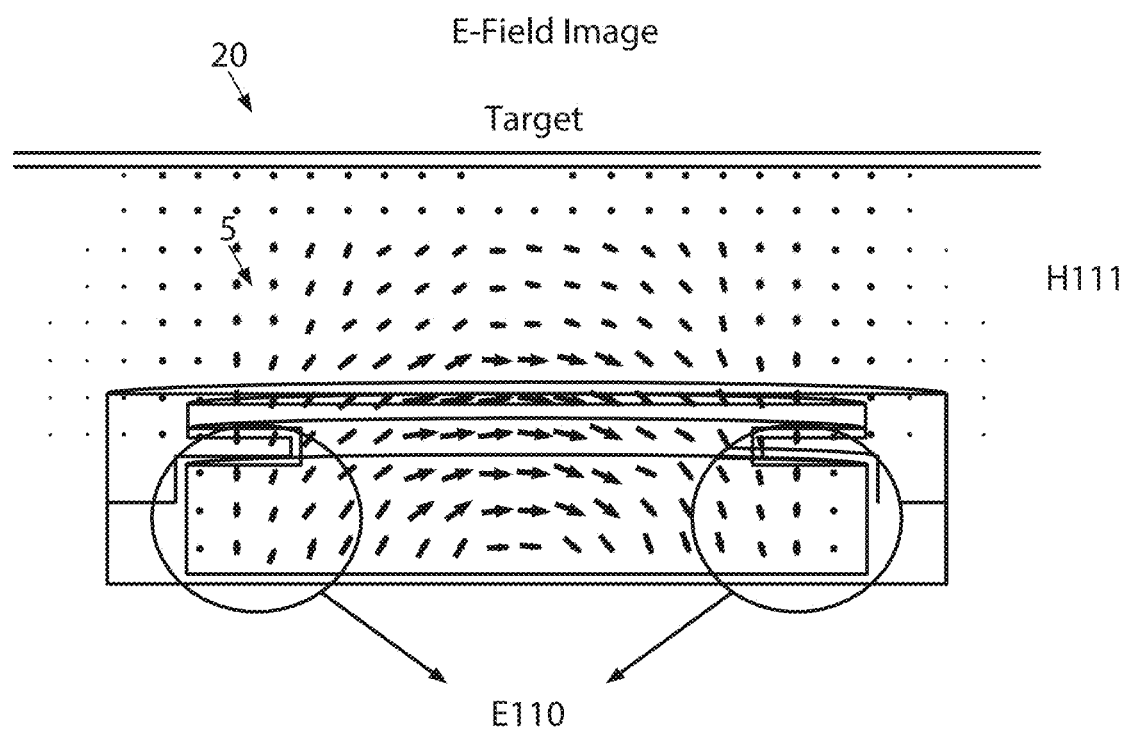

FIG. 19 shows a mode of operation in the form of the E-field image with the H111/E110 mode with the target and resonance structure.

Figure 20:
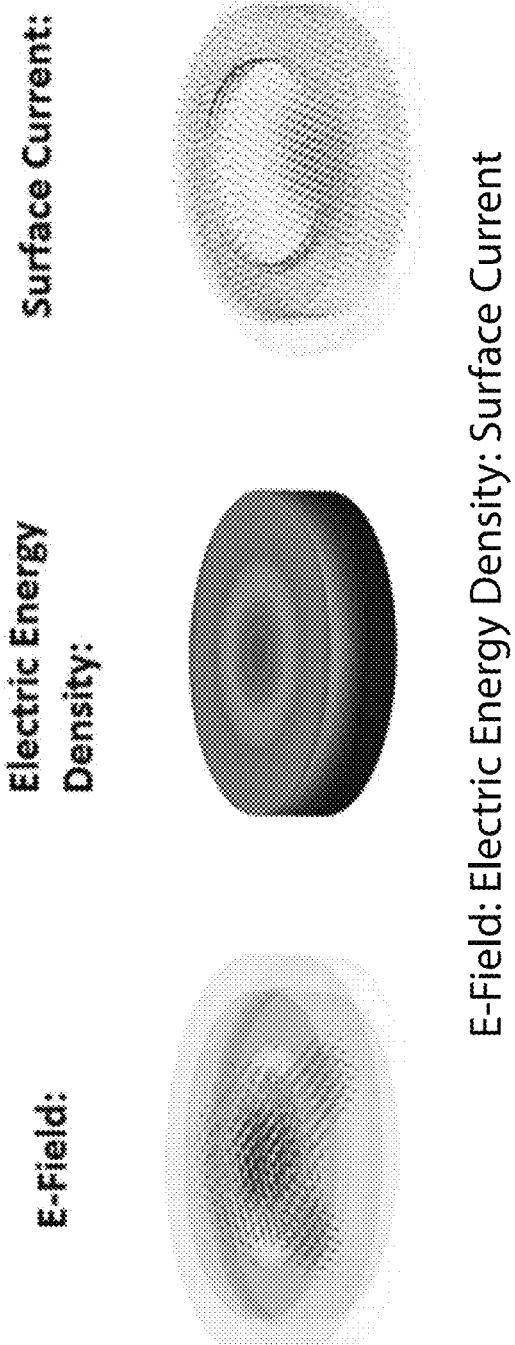

FIG. 20 shows mode formers for H111/E110 with E-field, electric energy density and surface current.

Figure 21:
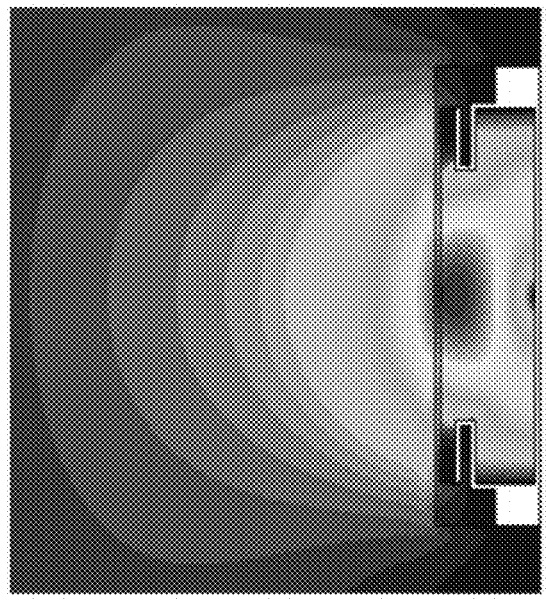
Figure 21:
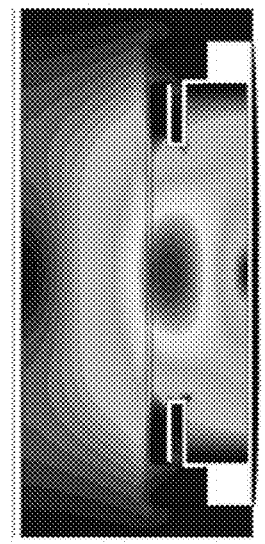

FIG. 21 shows cross-sections of the E-field with target distance 5 mm as an example or without a target.

Figure 22:
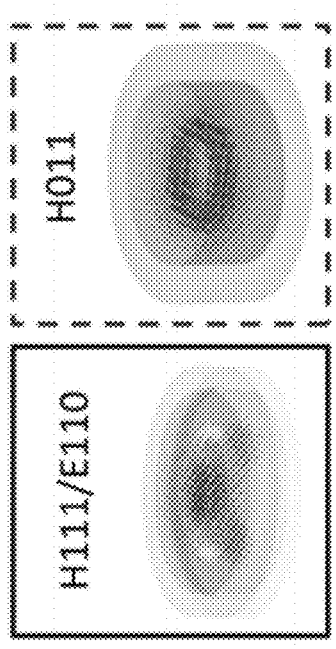
Figure 22:
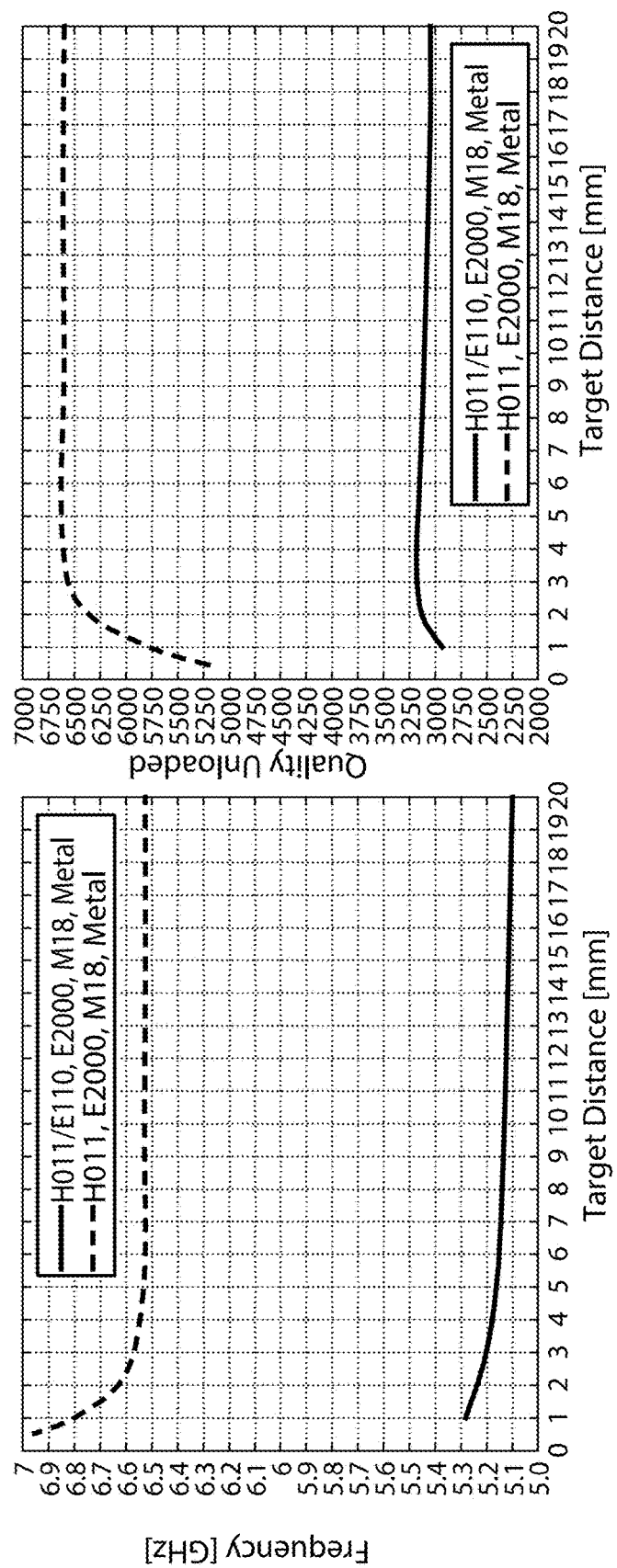

FIG. 22 illustrates a frequency curve and a quality curve (unloaded) over the target distance for the H111/E110 mode.

Figure 23:
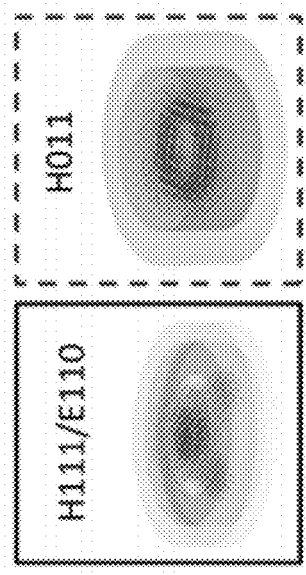
Figure 23:
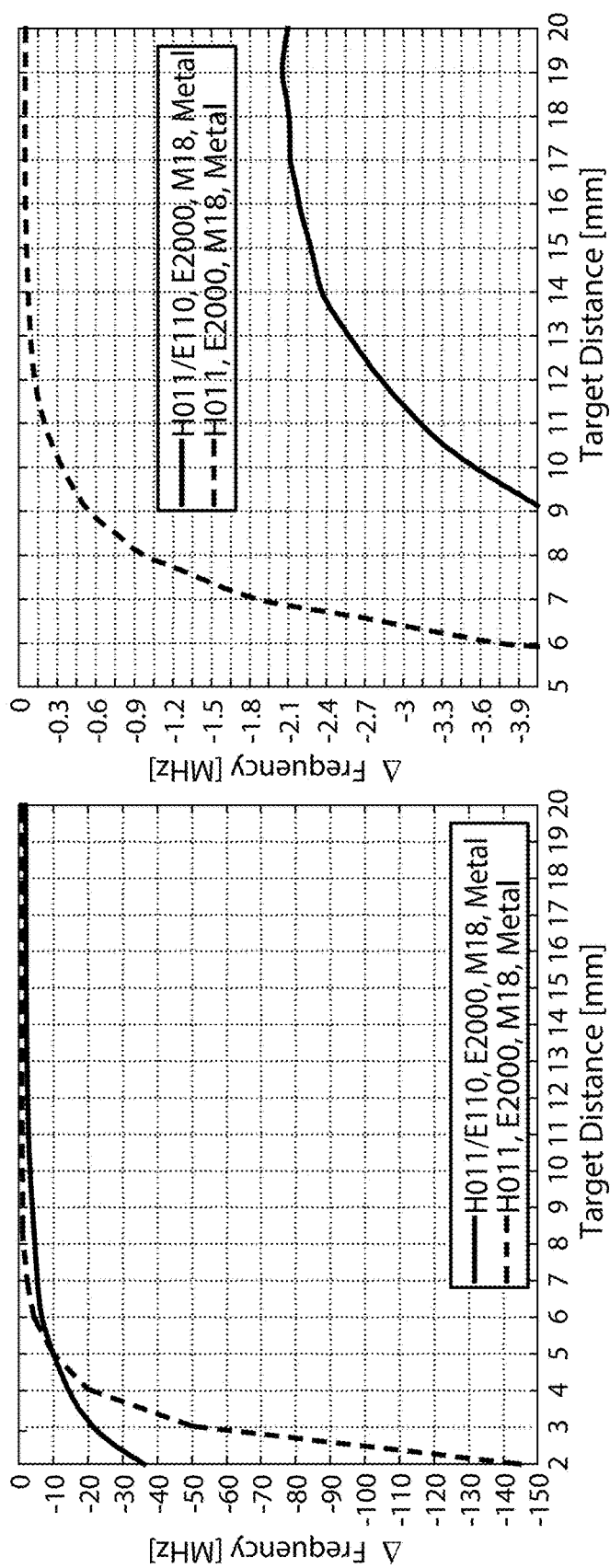

FIG. 23 illustrates frequency change curves over the target distance for the H111/F110 mode.

Since, moreover, these drawings can be understood in their own right and are suitable and are to be understood as independent disclosure, it is not necessary to provide a more detailed description of the latter.

What is claimed is:

1. A sensor unit that is configured to measure distance to a target, the sensor unit comprising:
  a resonance structure comprising a cylindrical block of dielectric material, the cylindrical block of dielectric material having an outer wall, where the cylindrical block of dielectric material includes a ring-shaped recess that extends inwardly from the outer wall towards a center axis of the cylindrical block of dielectric material, where the ring-shaped recess is symmetric about the center axis of the cylindrical block of dielectric material such that a notch is formed in the outer wall; and
  control electronics electrically coupled to the resonance structure, wherein the control electronics are configured to output a distance between the sensor unit and the target based upon a signal output by the resonance structure.

2. The sensor unit of claim 1, wherein a height of the ring-shaped recess along the center axis is 5 to 25% of a height of the cylindrical block of dielectric material along the center axis.

3. The sensor unit of claim 1, wherein a height of the ring-shaped recess along the center axis is between 0.2 mm and 1.0 mm.

4. The sensor unit of claim 1, wherein a depth of the ring-shaped recess from the outer wall of the cylindrical block of dielectric material towards the center axis is 5-25% of a diameter of the cylindrical block of dielectric material.

5. The sensor unit of claim 1, wherein a depth of the ring-shaped recess from the outer wall of the cylindrical block of dielectric material towards the center axis is 1.0-3.8 mm.

6. The sensor unit of claim 1, further comprising a sleeve, wherein the resonance structure is partially disposed within the sleeve, and further wherein an upper region of the cylindrical block of dielectric material is located above the sleeve.

7. The sensor unit of claim 6, wherein the ring-shaped recess is located in the upper region of the cylindrical block.

8. The sensor unit of claim 1, wherein the cylindrical block of dielectric material has a lower region and an upper region, wherein the lower region is displaced from the upper region along the center axis, and further wherein the lower region is metalized.

9. The sensor unit of claim 1, wherein the resonance structure further comprises a plastic that surrounds the cylindrical block of dielectric material.

10. The sensor unit of claim 1, further comprising:
  a first resonator coupling point that is coupled to the cylindrical block of dielectric material; and
  a second resonator coupling point that is coupled to the cylindrical block of dielectric material, wherein the first resonator coupling point is geometrically offset from the second resonator coupling point by 90°.

11. The sensor unit of claim 10, further comprising:
  a voltage-controlled oscillator (VCO) that is electrically coupled to the control electronics, wherein the VCO is configured to receive a tuning voltage signal from the control electronics and output a frequency modulated signal based upon the tuning voltage signal; and
  a 90° phase shifter that is electrically coupled to the VCO and is configured to shift a phase of the frequency modulated signal by 90°, wherein the frequency modulated signal is provided to the first resonator coupling point and output of the 90° phase shifter is provided the second resonator coupling point.

12. A method for forming a sensor unit, the method comprising:
  providing a resonance structure, the resonance structure comprising a solid cylindrical block of dielectric material that has an outer wall, the cylindrical block of dielectric material having a ring-shaped recess that extends from the outer wall towards a center axis of the cylindrical block of dielectric material such that a notch is formed in the outer wall of the cylindrical block of dielectric material; and
  electrically coupling control electronics to the resonance structure, wherein the control electronics are configured to output a distance between the sensor unit and a target based upon a resonance frequency of the resonance structure.

13. The method of claim 12, wherein a height of the ring-shaped recess along the center axis is 5 to 25% of a height of the cylindrical block of dielectric material along the axis.

14. The method of claim 12, wherein a height of the ring-shaped recess along the center axis is between 0.2 mm and 1.0 mm.

15. The method of claim 12, wherein a depth of the ring-shaped recess from the outer wall of the cylindrical block of dielectric material towards the center axis is 5-25% of a diameter of the cylindrical block of dielectric material.

16. The method of claim 12, wherein a depth of the ring-shaped recess from the outer wall of the cylindrical block of dielectric material towards the center axis is 1.0-3.8 mm.

17. The method of claim 12, further comprising partially disposing the cylindrical block of dielectric material within the sleeve, wherein an upper region of the cylindrical block of dielectric material is located above the sleeve.

18. The method of claim 17, wherein the ring-shaped recess is located in the upper region of the cylindrical block.

19. The method of claim 12, wherein the cylindrical block of dielectric material has a lower region and an upper region, wherein the lower region is displaced from the upper region along the axis, and further wherein the lower region is metalized.

20. A sensor unit for detecting distance to a target, the sensor unit comprising:
- a resonance structure comprising a solid cylindrical block of dielectric material, the solid cylindrical block of dielectric material having an outer wall, where the outer wall of the cylindrical block of dielectric material includes a ring-shaped recess that extends towards a center axis of the cylindrical block of dielectric material and is symmetric about the center axis;
- a first resonator coupling point that is coupled to the cylindrical block of dielectric material;
- a second resonator coupling point that is coupled to the cylindrical block of dielectric material, wherein the first resonator coupling point is geometrically offset from the second resonator coupling point by 90°;
- control electronics electrically coupled to the resonance structure, wherein the control electronics are configured to output a tuning voltage signal;
- a voltage controlled oscillator (VCO) that is electrically coupled to the control electronics, the VCO configured to receive the tuning voltage signal and output a frequency modulated signal based upon the tuning voltage signal, wherein the frequency modulated signal is provided to the first resonator coupling point; and
- a 90° phase shifter that is electrically coupled to the VCO and is configured to receive the frequency modulated signal and shift a phase of the frequency modulated signal by 90° to form a phase shifted signal, wherein the phase shifted signal is provided the second resonator coupling point, and further wherein the control electronics are configured to output a distance between the sensor unit and the target based upon an output signal received by the control electronics from the cylindrical block of dielectric material.

* * * * *